United States Patent
Gratzel et al.

(10) Patent No.: US 9,805,740 B2
(45) Date of Patent: Oct. 31, 2017

(54) LANGUAGE ANALYSIS BASED ON WORD-SELECTION, AND LANGUAGE ANALYSIS APPARATUS

(71) Applicant: PSYWARE GMBH, Aachen (DE)

(72) Inventors: Dirk C Gratzel, Aachen-Lintert (DE); Christian Greb, Aachen (DE)

(73) Assignee: PSYWARE GMBH, Aachen (DE)

( * ) Notice: Subject to any disclaimer, the term of this patent is extended or adjusted under 35 U.S.C. 154(b) by 122 days.

(21) Appl. No.: 14/770,739

(22) PCT Filed: Feb. 25, 2014

(86) PCT No.: PCT/EP2014/053643
§ 371 (c)(1),
(2) Date: Aug. 26, 2015

(87) PCT Pub. No.: WO2014/131763
PCT Pub. Date: Sep. 4, 2014

(65) Prior Publication Data
US 2016/0005421 A1 Jan. 7, 2016

(30) Foreign Application Priority Data
Feb. 26, 2013 (DE) .......................... 10 2013 101 871

(51) Int. Cl.
*G10L 19/00* (2013.01)
*G10L 25/51* (2013.01)
(Continued)

(52) U.S. Cl.
CPC ............ *G10L 25/51* (2013.01); *G10L 15/183* (2013.01); *G10L 15/1822* (2013.01)

(58) Field of Classification Search
CPC ................. G06F 21/316; G06F 21/552; G06F 17/30705; G06F 21/6236; G06Q 30/0201;
(Continued)

(56) References Cited

U.S. PATENT DOCUMENTS 5,251,131 A * 10/1993 Masand .............. G06F 17/2785
704/9
5,497,319 A * 3/1996 Chong ................ G06F 17/2264
704/10

(Continued)

FOREIGN PATENT DOCUMENTS

WO 2005027091 3/2005
WO 2011117593 9/2011

OTHER PUBLICATIONS

Rong Zheng, Authorship Analysis in Cybercrime Investigation, Artificial Intelligence Lab Department of Management Information Systems, 2003, pp. 59-73.
(Continued)

*Primary Examiner* — Michael Colucci
(74) *Attorney, Agent, or Firm* — Lucas & Mercanti, LLP

(57) ABSTRACT

The invention relates to a method for wording-based speech analysis. In order to provide a method that allows automated analysis of largely arbitrary features of a person from whom a voice file that needs to be analyzed comes, the invention detaches itself from the known concept of evaluating static keyword lists for the personality type. The method according to the invention comprises the preparation of a computer system by formation of a reference sample that allows the comparison that is necessary for feature recognition with other persons. The preparation of the computer system involves the recording and storage of a further voice file in addition to the voice files of the reference sample, the analysis of the additionally recorded voice file and the output of the recognized features using at least one output unit connected to the computer system. Furthermore, the invention relates to a speech analysis device for carrying out the method.

16 Claims, 9 Drawing Sheets

(51) Int. Cl.
*G10L 15/18* (2013.01)
*G10L 15/183* (2013.01)

(58) Field of Classification Search
CPC .... G06Q 30/0204; G06Q 50/22; G10L 15/18; G10L 15/1807; H04L 29/06836; H04L 29/08936; H04L 67/30; H04L 67/306
USPC ........... 704/10, 2, 250, 257, 270, 9; 706/12; 707/708, 736, 737, 749; 709/204, 219; 715/234
See application file for complete search history.

(56) References Cited

U.S. PATENT DOCUMENTS

| | | | | |
|---|---|---|---|---|
| 5,696,981 A * | 12/1997 | Shovers | G09B 7/02 | 434/236 |
| 6,269,369 B1 * | 7/2001 | Robertson | G06Q 10/02 | |
| 6,502,081 B1 * | 12/2002 | Wiltshire, Jr. | G06F 17/30707 | 706/12 |
| 7,177,798 B2 * | 2/2007 | Hsu | G10L 15/18 | 704/10 |
| 7,490,048 B2 * | 2/2009 | Joao | G06F 19/322 | 705/2 |
| 7,519,902 B1 * | 4/2009 | Kraft | G06F 17/30864 | 715/234 |
| 7,966,369 B1 * | 6/2011 | Briere | G06Q 10/10 | 707/616 |
| 8,515,957 B2 * | 8/2013 | Knight | G06F 17/30713 | 707/737 |
| 8,543,573 B2 * | 9/2013 | MacPherson | G06N 5/02 | 707/736 |
| 8,589,414 B2 * | 11/2013 | Waite | G06Q 10/10 | 707/749 |
| 8,612,446 B2 * | 12/2013 | Knight | G06F 17/30705 | 707/737 |
| 8,719,009 B2 * | 5/2014 | Baldwin | G06Q 30/02 | 704/257 |
| 8,849,670 B2 * | 9/2014 | Di Cristo | G06F 17/279 | 704/257 |
| 9,026,428 B2 * | 5/2015 | Sternby | G06F 17/242 | 382/186 |
| 9,031,845 B2 * | 5/2015 | Kennewick | G06F 17/30654 | 455/517 |
| 2007/0271098 A1 * | 11/2007 | Stewart | G10L 17/26 | 704/257 |
| 2008/0109214 A1 * | 5/2008 | Shaw | G06F 17/279 | 704/9 |
| 2009/0313018 A1 * | 12/2009 | Degani | G10L 15/06 | 704/250 |
| 2011/0093449 A1 * | 4/2011 | Belenzon | G06N 7/005 | 707/708 |
| 2011/0125747 A1 * | 5/2011 | Gartung | G06F 17/30707 | 707/737 |
| 2012/0072546 A1 * | 3/2012 | Etchegoyen | G06F 17/30241 | 709/219 |
| 2012/0221496 A1 * | 8/2012 | Goyal | G06F 17/30705 | 706/12 |
| 2013/0231922 A1 * | 9/2013 | Park | G06F 17/2735 | 704/9 |
| 2014/0244264 A1 * | 8/2014 | Thirumalainambi | G06F 17/2785 | 704/270 |

OTHER PUBLICATIONS

English translation of the International Preliminary Report on Patentability for PCT/EP2014/053643.
Francois Mairesse, Using Linguistic Cues for the Automatic Recognition of Personality in Conversation and Text, Journal of Artificial Intelligence Research, 2007, pp. 457-500.
Jennifer Goldbeck, Predicting Personality with Social Media, Proceedings of the 2011 Extended Abstracts on Human Factors in Computing Systems, Jan. 1, 2011, pp. 253-262.
Jennifer Goldbeck, Predicting Personality from Twitter, International Conference on Privacy, Security, Risk and Trust, 2011, pp. 149-156.
Sharon S. Smith, Forensic Psycholinguistics: Using Language Analysis for Identifying and Assessing Offenders, FBI Law Enforcement Bulletin, 4, 2002, pp. 16-21.

* cited by examiner

LANGUAGE ANALYSIS BASED ON WORD-SELECTION, AND LANGUAGE ANALYSIS APPARATUS

CROSS-REFERENCE TO RELATED APPLICATIONS

This application is a 371 of PCT/EP2014/053643 filed Feb. 25, 2014, which in turn claims the priority of DE 10 2013 101 871.8 filed Feb. 26, 2013, the priority of both applications is hereby claimed and both applications are incorporated herein by reference.

BACKGROUND OF THE INVENTION

The invention relates to a method for automated language analysis based on word-selection and to
a language analysis apparatus.
Psycholinguistics or the psychology of language is concerned with the processes of language acquisition, language comprehension (knowledge of the language) and language production:
Language acquisition: how can children pick up and apply linguistic knowledge?
Language comprehension: what means and what knowledge are used to grasp and establish the meanings and sense of words, sentences and texts?
Language production: how can language be articulated in a way that conveys meaning?
Language psychologists distinguish four successive stages in these processes:
(1) Conceptualization of an idea, thought or feeling to be expressed
(2) Creation of a linguistic procedure
(3) Articulation as the implementation of the procedure
(4) Monitoring of the articulation
These processes are concerned with the cognitive, thought-based and knowledge-based aspects of language. Yet the question of how personality is expressed in language was for many years of almost no interest to psychologists, with the exception of Freud, whose theses still have no empirical basis, however.
In addition to context-based qualitative analysis models, some of which were extremely time-consuming and resource-intensive and which were geared towards relatively large language units such as sentences and entire texts, there emerged in the 1960s and 1970s with the advent of the computer, automated analysis techniques known as "word-count methods", which used an objective, quantitative approach and were based on small language units.
U.S. Pat. No. 5,696,981 B1 discloses a method and a language analysis apparatus for automated personality analysis based on word selection. A program stored on a personal computer contains lists of keywords, each list comprising a multiplicity of words associated with one of six personality types. For the purpose of the personality analysis, a language file is recorded which comprises a multiplicity of words of a person who is meant to be analyzed. The words may originate, for example, from a questionnaire, a monologue or a text written by the person. They are entered in the computer system as a text, or for a monologue converted automatically into a language file by voice recognition. As part of the automated personality analysis, the language file is examined to determine whether it contains keywords from the six lists of keywords. This involves a multistage process in which the keywords identified in the language file are weighted and associated with one of the six personality types according to context on the basis of the keywords contained in the six lists. For the output of the result of the personality analysis, the weighted keywords are summated for each of the six personality types, and the association of the personality to the six personality types is made as a percentage, in particular represented in a bar chart.
A disadvantage of the known method is that only one automated personality analysis based on word selection is possible. Other characteristics of the person from whom the language file originates cannot be determined using this method. The short keyword lists only overlap with a very small part of the recorded language files. Hence the personality analysis looks at only a small part of the language file. In addition, the keyword lists and the analysis based on said lists are static, and hence the quality of the personality analysis is highly dependent on the choice of keywords.

BRIEF SUMMARY OF THE INVENTION

Proceeding from this prior art, the object of the invention is to create a method that does not have the aforesaid disadvantages and in particular allows automated analysis of practically any characteristics of a person from whom a language file to be analyzed originates. In addition, a language analysis apparatus shall be proposed.
The method and the language analysis apparatus allow the automated recording of speech messages and voicemails by telephone, mobile phone, email, SMS, chat or blog, analysis of same and derivation directly therefrom of characteristics relating to an individual personality, for example for the purpose of coaching or advice.
The language analysis apparatus can be used to infer e.g. the personality and/or psychological state of the speaker in a comprehensive and reliable manner, and thereby make it possible for advisers, coaches or personnel officers, for instance, to communicate on a more personalized basis.
In order to analyze practically any characteristics of a person, the invention diverges from the known concept of analyzing static keyword lists with regard to the personality type. A requirement for analyzing characteristics is a comparison with other people. For this purpose, the method according to the invention includes preparing the computer system in accordance with the features aa) to ad):
Storing a plurality of language files from different people, for example at least 1000 language files, in a memory unit of the computer system in accordance with feature aa) forms a sufficiently broad reference sample, which allows the comparison with other people that is required for recognizing characteristics, wherein each language file comprises a minimum number of words, preferably at least 100 words.
Each language file and/or each reference language file can exist directly as a text file or as an audio file, which is converted into a text file by a transcription. The text file is input via an input unit, for example a keyboard. The audio file is converted in particular by voice recognition software. In one embodiment of the method according to the invention, prosodic information on the language file can additionally be extracted from the audio file.
The dictionary file stored in accordance with feature ab) covers at least 80%, although preferably even at least 95%, of the words contained in the language files. Using such comprehensive dictionary files that include at least the core vocabulary, instead of keyword lists ensures that the analysis can include large parts of the language files. The words in the dictionary file are stored in a multiplicity of different categories, wherein all the words in the dictionary file are classified in at least one of the categories. The individual categories contain, for example, different parts of speech such as adverbs, pronouns, prepositions, conjunctions or indefinite pronouns, or words from a specific semantic field, such as negations or words associated with positive or negative, for instance. The categories can also contain what are known as n-grams: word combinations that frequently occur in a specific sequence. In total preferably at least 250 of such categories are provided.

The individual comparison in accordance with feature ac) calculates the percentage frequency of the words contained in each category of the dictionary file with respect to the number of words in each reference language file. Using statistical and/or algorithmic methods, in accordance with feature ad) an association is made between the calculated values for the percentage frequency and the known characteristics of the people from whom the reference language files originate. From the associations it is possible to derive rules that in a next step can be used to predict, for language files that are not part of the pre-recorded reference language files and originate from people for whom no characteristics are known, characteristics that are likely to belong to the people from whom the language files originate.

When creating the set of rules, a multidimensional space is produced that has as many dimensions as there are categories in the dictionary file and, if applicable, items of information to be included. The reference language files in the reference sample are arranged in this space according to the percentage frequencies in the individual categories and, if applicable, according to the nature of the additional information.

Groups are formed in this multidimensional space on the basis of the known characteristics of the people from whom the reference language files originate. The reference language files of people having a known characteristic, for example a high level of conscientiousness, are located in specific parts of the multidimensional space, and the reference language files of people having a low level of conscientiousness are located in other parts of the multidimensional space.

The different parts of the space are separated from one another as distinctly as possible using the statistical and/or algorithmic methods. The distinct separation ensures that the subsequently recorded language files that are not part of the reference language files can be assigned as accurately as possible to a part of the multidimensional space using the set of rules.

After preparing the computer system in accordance with features aa)-ad), in addition to the reference language files of the reference sample, the language files are recorded for people who have no known characteristics. These language files are analyzed in accordance with feature c):

The individual comparison (feature ca)) of the language file with the dictionary file by calculating the percentage frequency of the words contained in each category of the dictionary file with respect to the number of words in the language file is a precondition for further processing of the language file using the set of rules in accordance with feature cb) as follows:

Statistical and/or algorithmic methods are used to process the percentage frequencies in each category calculated in accordance with feature ca). The calculated percentage frequencies are examined for similarities with the percentage frequencies calculated in accordance with feature ac). The language file is classified according to the established similarities and associated with the occurrence of at least one known characteristic belonging to the different people from whom the reference language files originate. In order to improve the accuracy of the analysis, the examination for similarities can be restricted to those categories of the dictionary file that are relevant to a specific characteristic.

The characteristics associated with a language file are output in the form of an output file. The output file can be displayed directly on a screen and/or output via a loudspeaker and/or printed by a printer. The output file can also be supplied, however, to further data-processing processes, for example to a data transmission process which is used to transmit the output file via a network to a recipient computer of the computer system. In addition, the output file can be supplied to an automatic response process, for example, which automatically generates a response according to the characteristic(s) associated with the language file. The responses can be stored as standard responses in a database which contains associations between the characteristics and the standard responses. The automatically generated response is communicated, for example, to the person from whom the analyzed language file originates. It is also or additionally possible, however, to transmit the response to a third party such as, for instance, the person running the automatic language analysis based on word selection. The response can be communicated as a text-based message and/or as an audio file. The text-based message and/or the audio file can be output by a computer in the computer system, which computer comprises a display unit and an electroacoustic transducer and may be a mobile phone or a personal computer, for instance.

One embodiment of the present invention provides a method in which the database of the reference samples is enlarged. Enlarging the database improves the validity of the analysis because the statistical and/or algorithmic associations in the set of rules are based on a broader reference sample. In order to create a self-learning method, feedback can be provided which allows evaluation of the correctness of the characteristics associated in the analysis of the language file in accordance with feature c). The feedback can be made, for example, by an entry on a screen of a personal computer, where predefined selection fields such as e.g. "true, partly true, untrue" are used for the evaluation. The feedback can be entered, for example, by the person from whom the language file originates. If the reference sample is expanded, the set of rules must be updated and resaved, taking into account the enlarged database in accordance with feature ad). Updating and saving can be performed at time intervals once a plurality of language files have been added to the reference sample.

By adding to the reference sample only those language files that have a specified minimum number of words ensures that only language files suitable for improving the set of rules are added to the reference sample. The minimum number of words preferably equals 100 words.

In an advantageous embodiment of the invention, at least once during recording of the additional language file, a partial file of the language file is buffered in the memory unit of the computer system, and the partial file is analyzed. The buffering and analysis allow interim results to be displayed while the language file is still being recorded. This allows effectively an "online analysis", which may be of particular interest, for example, when analyzing language files communicated via the telephone. In police work, for instance, characteristics of a caller can be determined while the phone call is still in progress. A partial file is buffered automatically either after a certain number of words is reached in a language file or after a certain time has elapsed for recording the language file.

The output file and/or the preliminary output file preferably contains information on personality traits and/or characteristics that describe the psychological state of the person from whom the language file originates. For this purpose, the examination of the similarities of the language file is restricted to those categories of the dictionary file that are relevant to said characteristics.

For instance in order to allow preselection of the native language or better alignment with the characteristics of the person from whom the language file originates, which characteristics are to be identified by the method, it is proposed in one embodiment of the invention that the dictionary file is stored on the computer system according to the intended use of the method. Preferably a plurality of dictionary files with different content are stored on the computer system, which files can be selectively enabled according to the intended use of the method.

In a further embodiment of the method according to the invention the result of the automated language analysis based on word selection is improved in that at least one additional item of information is additionally recorded for each reference language file and for each language file to be analyzed. The additional information in particular is prosodic information such as, for instance, the duration (e.g. rate of speaking, pauses), the frequency (e.g. average pitch, maximum pitch) and the power (e.g. volume in dB) or syntactic and/or morphological information. Specifically, taking into account the additional information in the language analysis based on word selection requires the following measures:

- The step of additionally recording the at least one additional item of information of each reference language file is added to the preparation of the computer system in accordance with feature a). This information, e.g. the volume, duration or frequency, is available as a measured value for each reference language file and can therefore be processed directly by the set of rules. Syntactic and/or morphological information, e.g. the frequency of use of substantives, is also available as a numerical value for each reference language file and can therefore be processed directly by the set of rules.
- The set of rules is designed to process the additional information directly in such a way that using statistical and/or algorithmic methods it also determines associations between the additional information recorded as measured values or numerical values and the known characteristics of the people from whom the reference language files originate.
- The subsequent recording and storage of a language file to be analyzed in accordance with feature b) additionally requires that at least one additional item of information is recorded for each language file.
- The analysis of the language file in accordance with feature c) comprises in addition to processing the percentage frequencies calculated in accordance with feature ca), using the set of rules to process the at least one additional item of information of each recorded language file, wherein the set of rules uses the statistical and/or algorithmic methods to examine the at least one additional item of information of each language file for similarities with this at least one additional item of information in the reference language files.

The set of rules classifies the language file, taking into account all the established similarities with the reference language files, in the multidimensional space defined by the categories and by each additional item of information, and associates the language file with the occurrence of at least one known characteristic belonging to the various people from whom the reference language files originate.

As already explained in the introduction, the output file can be supplied to an automatic response process, which generates a response automatically according to the characteristic(s) associated with the language file. This response file is created as an audio file. The audio file is output by means of an electroacoustic transducer connected to the computer system. By controlling the output of the audio file by the electroacoustic transducer according to the characteristics contained in the output file, the output of the response can be adapted to the personality and/or the psychological state of the person from whom the analyzed language file originates to which a response shall be made. The audio-file output is controlled according to the characteristics contained in the output file preferably by modifying the duration and/or the frequency and/or the power of the output.

The technical adaptation of the audio-file output can be used, for instance, in an automatic call response system. If the language analysis based on word selection identifies an anxious or neurotic caller, the voice output is slowed down and the frequency lowered.

The language analysis apparatus for automatic voice analysis based on word selection comprises
- a computer system having at least one memory unit,
- an input unit connected to the computer system,
- an output unit connected to the computer system, and
- a program that is designed to execute the method described above.

Within the meaning of the invention, the computer system can comprise just one computer or a plurality of interconnected computers. A computer in the computer system is a device that uses a data processing program to process data. Thus the computer system can comprise not only commercial personal computers but also smartphones and other programmable electronic devices. The connection between a plurality of computers can be made via a network or a plurality of networks, in particular also via the Internet. The computer system can comprise one or more memory units on which are stored the various files such as the dictionary and language files and program files. The files can be stored in a distributed manner on a plurality of memory units or altogether on a single memory unit.

If the computer system comprises a plurality of memory units, the language files and the dictionary files can be stored in different memory units in order to facilitate fast access to the various files for the individual comparison to be performed by the program.

If the reference language files and/or the language files are recorded not in text form, for example using a keyboard, but the spoken language is meant to be recorded as an audio file, the input unit comprises a voice recognition system known per se for transcribing the audio file into a text file. Furthermore, the computer system can be designed to extract prosodic information from each audio file.

A screen and/or a loudspeaker and/or a printer are possible as the output unit. Instead of outputting the output file directly via the output unit, the output file can be supplied to a further data-processing process via an interface, and the result of the are data-processing process is output by the output unit, for example by a loudspeaker.

It is possible, for example, to control a technical apparatus, for instance a telephone switchboard, automatically according to the characteristics contained in the output file (e.g. a personality trait of the person) in order to connect the person from whom the analyzed language file originates automatically to a call counterpart who suits their personality.

BRIEF DESCRIPTION OF THE DRAWINGS

The steps of the method according to the invention for automated language analysis on the basis of word selection are explained in greater detail below with reference to FIGS. 1 to 9 in which.

DETAILED DESCRIPTION OF THE PREFERRED EMBODIMENTS

Figure 1:
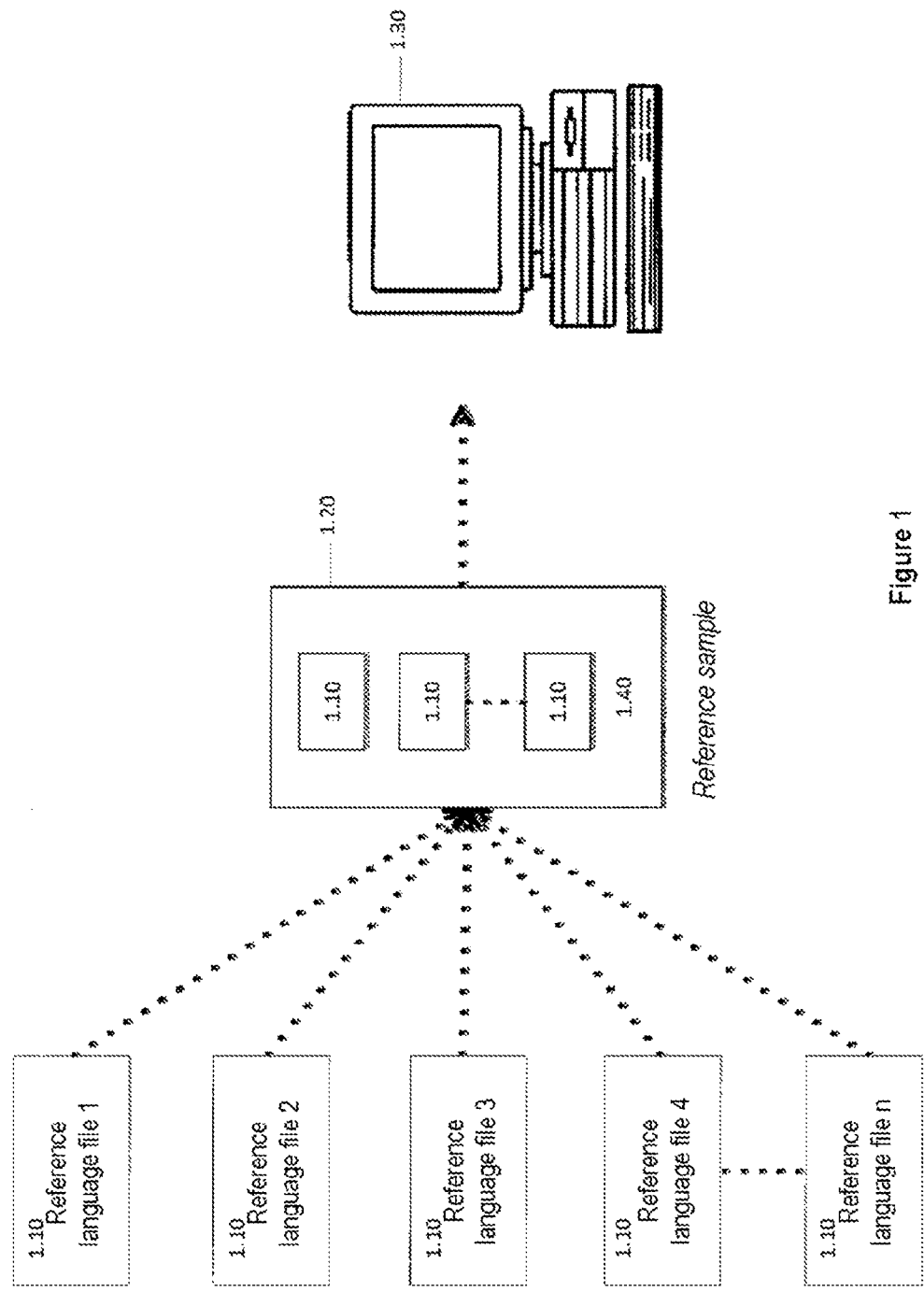
FIG. 1 is a schematic block diagram of an embodiment of the invention showing the step of storing reference language files.

FIGS. 1 to 5 show the preparation of the computer system of the language analysis apparatus:

First, as can be seen in FIG. 1, a plurality of (e.g. 1000) reference language files 1-n (1.10) are stored in a memory unit (1.20) of the computer system (1.30). These reference language files (1.10) form a reference sample (1.40). A reference language file (1.10) can here exist either directly as a text file or as a spoken audio file, which is converted into a text file in a transcription process using a voice recognition system. Each reference language file (1.10) comprises a minimum number of words, for example at least 100 words. All the reference language files (1.10) in the reference sample (1.40) that are to be stored originate from different people.

Figure 2:
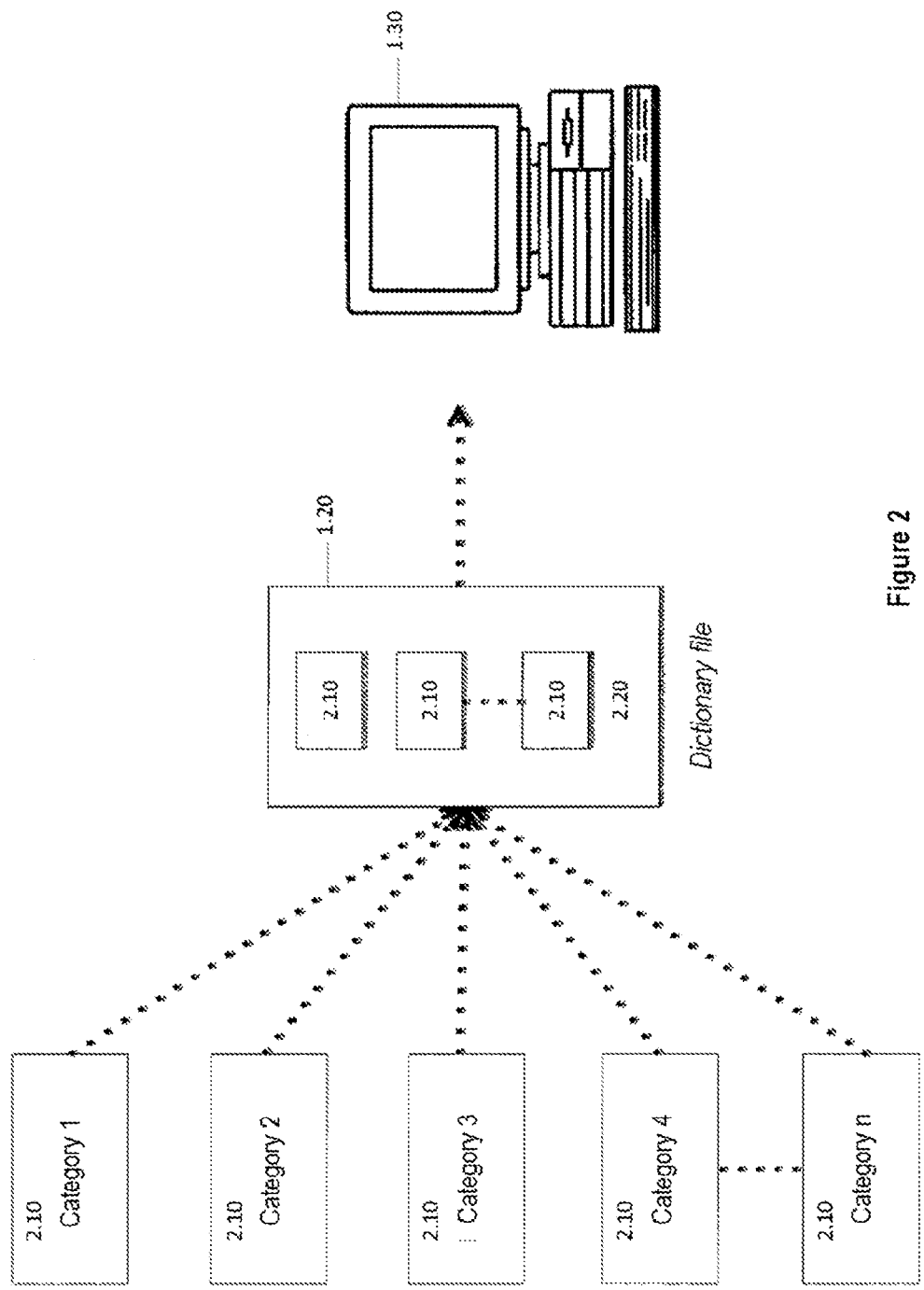
FIG. 2 is a schematic block diagram of an embodiment of the invention showing the step of storing a dictionary file.

FIG. 2 shows storing a dictionary file (2.20) containing a multiplicity of different categories 1-n (2.10) on the memory unit (1.20) of the computer system (1.30). The preferably more than 250 different categories (2.10) are, for example, the categories: adverbs, pronouns, negations, articles or words from a specific semantic field, or are words that frequently occur together, n-grams etc. All the words in the dictionary file (2.20) are classified in at least one of the categories (2.10).

Figure 3:
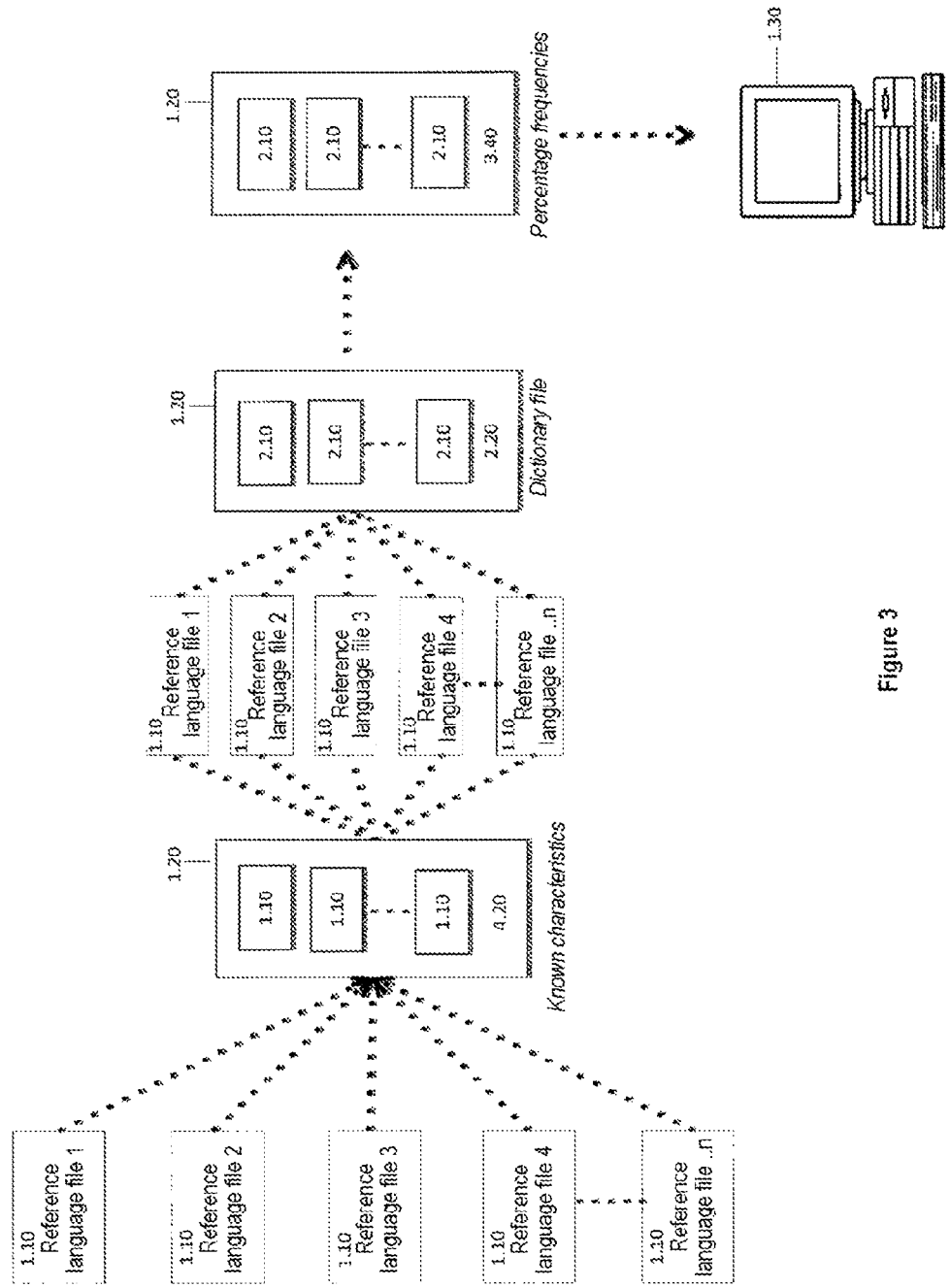
FIG. 3 is a schematic block diagram of an embodiment of the invention showing the step of preparing a set of rules.

FIG. 3 shows the steps for preparing a set of rules (5.40) (cf. FIG. 5), which is stored in the memory unit (1.20) for the purpose of preparing the computer system (1.30). The reference language files (1.10), which each originate from different test people, are recorded and stored in the memory unit (1.20). These people have known characteristics (4.20) such as e.g. known personality traits, motives, drives or a known psychological state. The reference language files (1.10) containing known characteristics (4.20) are analyzed using the dictionary file (2.20). In this analysis, individual comparisons of each reference language file (1.10) in the reference sample (1.40) are made with the dictionary file (2.20) stored in the memory unit (1.20). Percentage frequencies (3.40) of the words in each reference language file (1.10) that are contained in each category (2.10) of the dictionary file (2.20) are calculated with respect to the total number of words in this reference language file. These percentage frequencies (3.40) are stored in the memory unit (1.20) of the computer system (1.30) for further processing.

Figure 4:
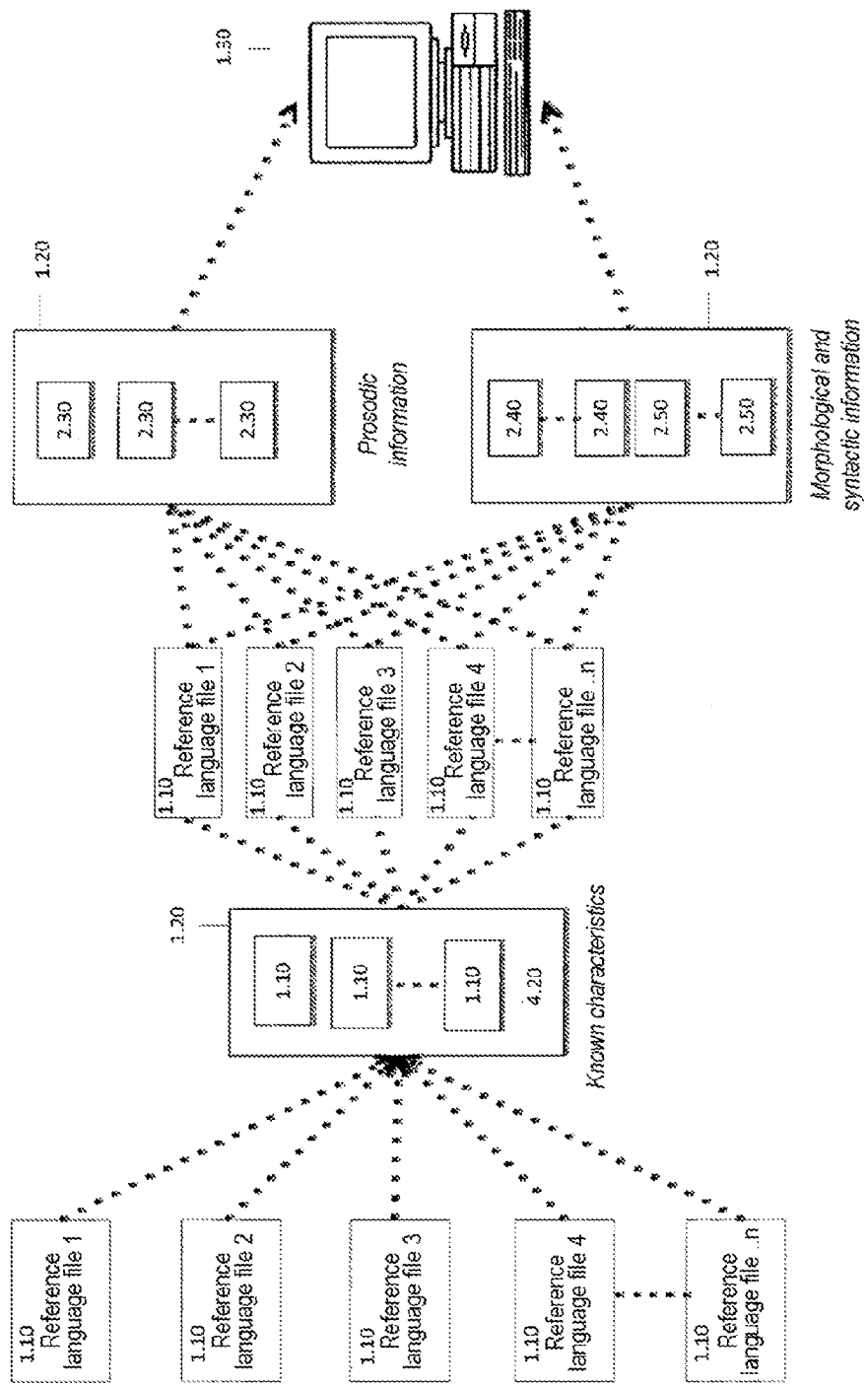
FIG. 4 is a schematic block diagram of an embodiment of the invention showing the step of extracting additional information from reference language files.

FIG. 4 shows the optional extraction of additional information from the reference language files (1.10) having known characteristics (4.20). If the reference language file (1.10) is transcribed from an audio file, prosodic information (2.30) can be obtained as the additional information and saved on the memory unit (1.20) of the computer system (1.30) for further processing. This is done by analyzing the audio file, which is to be transcribed, using programs known from the prior art for extracting prosodic speech characteristics from audio files, for instance using the open-source program "Praat" for signal-based phonetic analyses, which was developed by Paul Boersma and David Weenik at the Institute of Phonetic Sciences at the University of Amsterdam and has established itself as a quasi-standard in the scientific field of linguistics and communication.

In the exemplary embodiment, the power (e.g. volume in dB) of the audio file is recorded as the prosodic information (2.30).

In addition in the exemplary embodiment, morphological (2.40) and syntactic information (2.50) is also extracted from each language file transcribed from the audio file. The morphological information (2.40) relates to the different ways of forming words; it is a form of "word grammar". This information concerns conjugation, declination, combination, derivation and shortening of words contained in a reference language file (1.10). The number of words having a certain "word grammar" is counted. The syntax describes the "sentence grammar", which considers the way in which a sentence is constructed. This is done using specially trained part-of-speech taggers. This information also exists in the form of a numerical value. The information is stored, in a similar way to the percentage frequencies (3.40) in the categories (2.10), in a memory unit (1.20) of the computer system (1.30) for use in further calculations.

Figure 5:
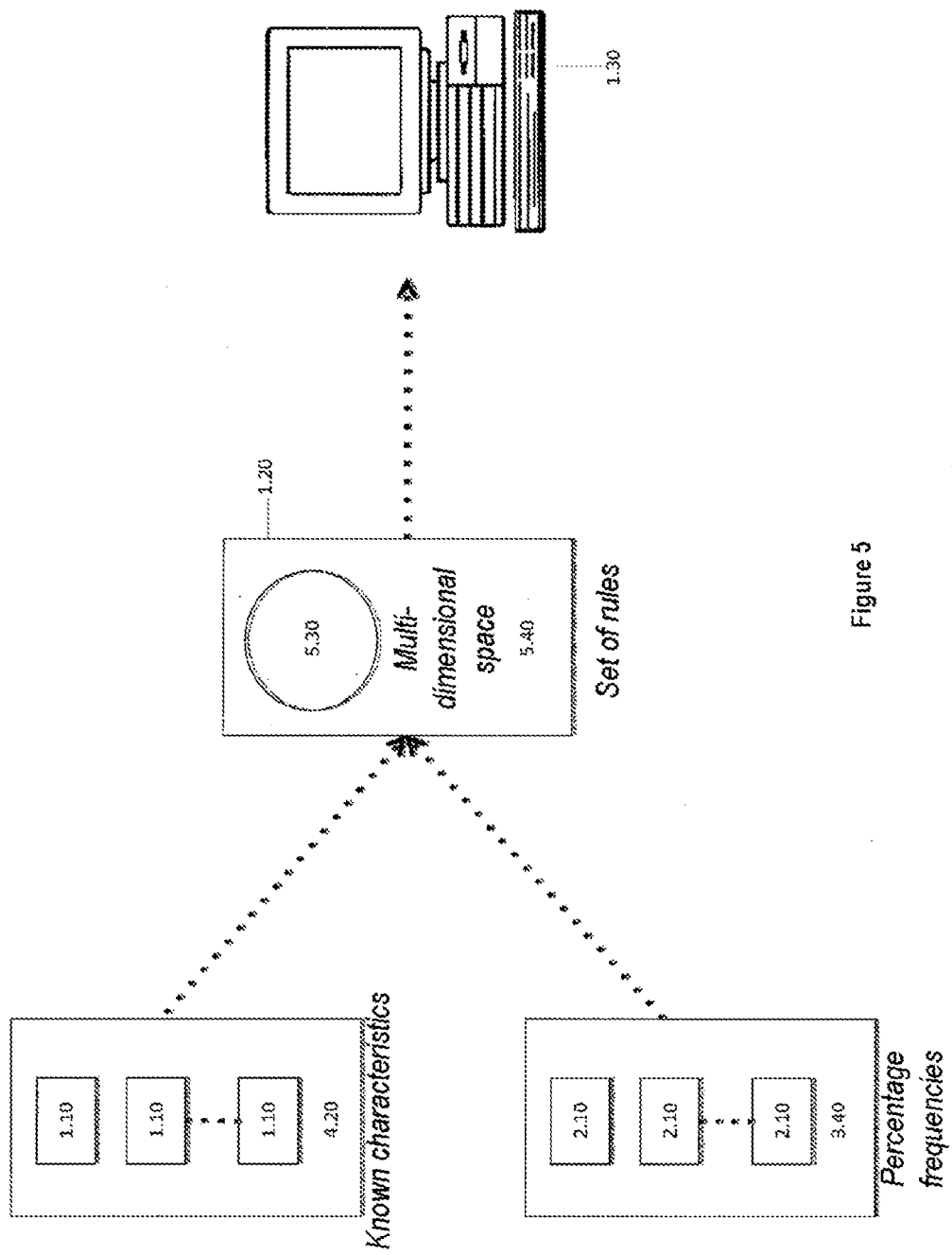
FIG. 5 is a schematic block diagram of an embodiment of the invention showing the step of comparing and combining percentage frequencies of each reference language file with known characteristics of the same reference language file in the set of rules.

The percentage frequencies (3.40) of each reference language file (1.10) in the individual categories (2.10) of the dictionary file (2.20), and the numerical values of any information that may be additionally extracted, are processed in the set of rules (5.40). The diagram in FIG. 5 shows for the sake of clarity only how the percentage frequencies (3.40) of each reference language file (1.10) are combined and compared with the known characteristics (4.20) of the same reference language files (1.10) in the set of rules (5.40).

In the set of rules (5.40), each category (2.10) becomes a dimension of a multidimensional space (5.30). The reference language files (1.10) of all the people having known characteristics (4.20) are arranged in the multidimensional space (5.30) according to the percentage frequency (3.40) of the words contained in each category (2.10). The arrangement is performed using statistical and/or algorithmic methods, which determine the associations at least between the percentage frequencies (3.40) and the known characteristics of the people from whom the reference language files (1.10) originate. A method known as a "Support Vector Machine" is used, for example, as an algorithmic method providing distinct separation. This method, in one embodiment, aims to place a hyperplane (multidimensional version of a straight line) in the multidimensional space in such a way as to provide in the say 100 dimensions an optimum spatial separation between people having a high, a moderate and a low occurrence of a certain known characteristic. Multidimensional regression techniques are particularly suitable as the statistical method. Irrespective of the statistical or algorithmic method used, rules are identified that specify how the reference language files are associated with the known characteristics of the people from whom the reference language files originate. This then makes it possible to predict, in a subsequent analysis step of a language file (6.10) from a person having unknown characteristics, the characteristics of the person from whom the additional language file (6.10) originates (cf. FIG. 6). The set of rules (5.40) is stored in the memory unit (1.20) of the computer system (1.30) (cf. FIG. 5).

Figure 6:
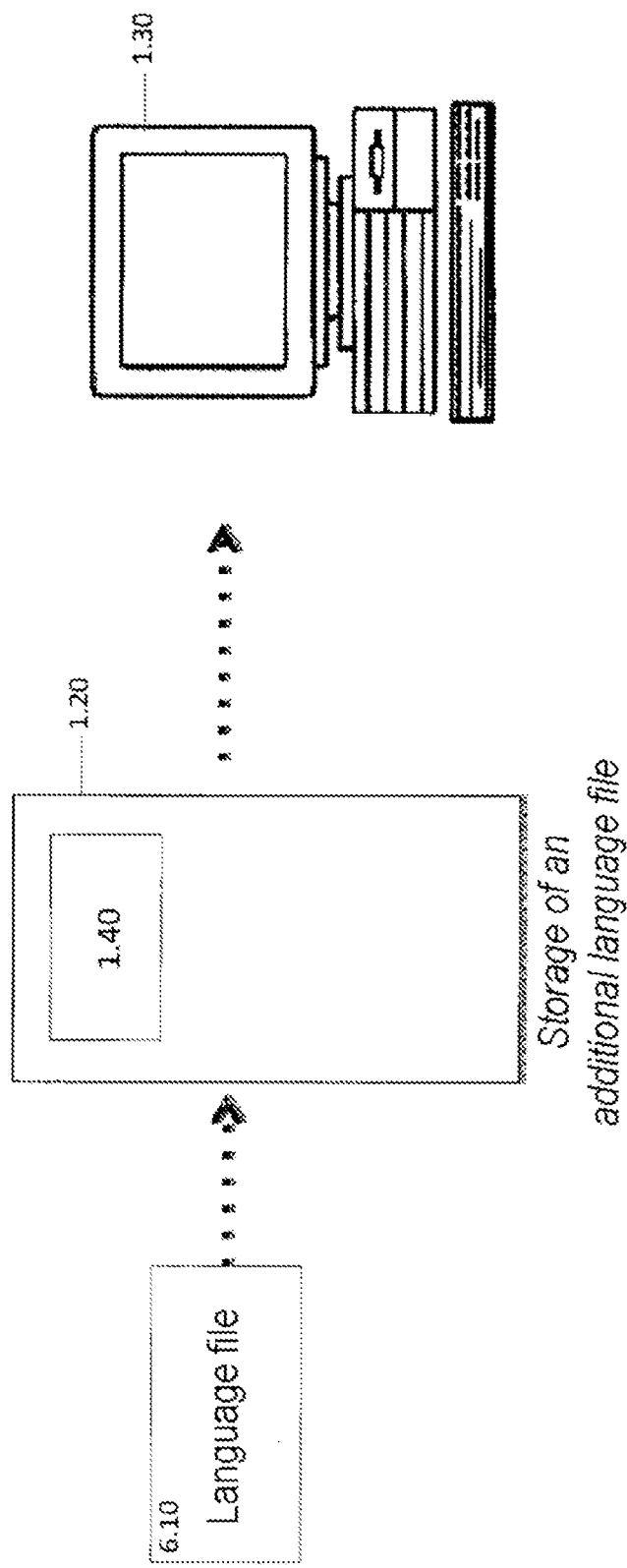
FIG. 6 is a schematic block diagram of an embodiment of the invention showing the step of storing an additional language file.

Preparation of the computer system is followed by recording and storing (as shown in FIG. 6) the language file (6.10), the characteristics of which are unknown, in addition to the language files (1.10) of the reference sample (1.40), in the memory unit (1.20) of the computer system (1.30). In this process, the language file (6.10) can either exist directly as a text file or as a spoken audio file, which is converted into a text file using a voice recognition system. Each language file (6.10) preferably comprises a minimum number of words, in particular at least 100 words.

Figure 7:
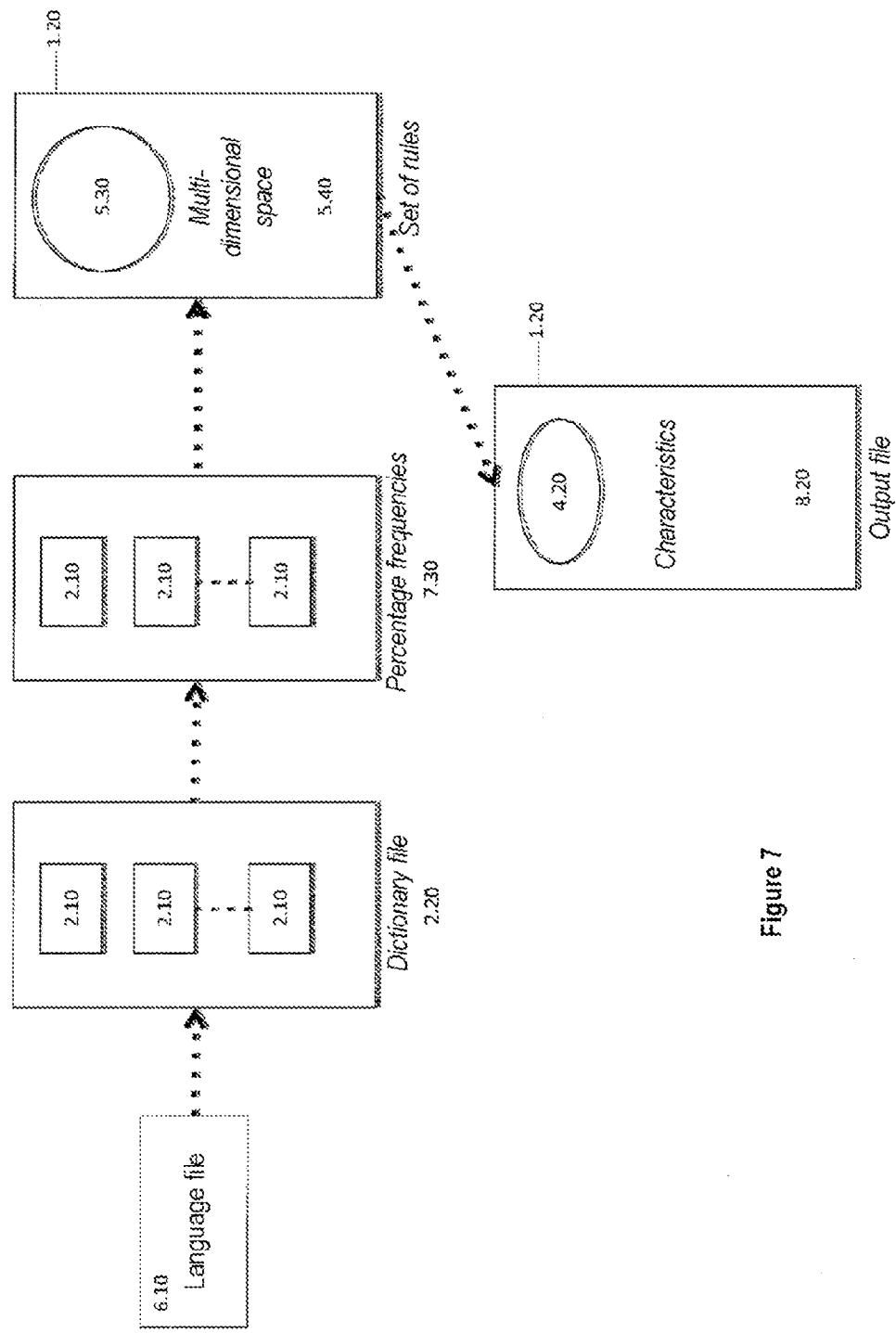
FIG. 7 is a schematic block diagram of an embodiment of the invention showing the step of analyzing the additional language file.

FIG. 7 shows the first step of the analysis of the language file (6.10) using the dictionary file (2.20) stored in the memory unit (1.20). Individual comparisons of the language file (6.10) are made with the dictionary file (2.20) in order to calculate the percentage frequencies (7.30) in the language file (6.10) of the words contained in each category (2.10) of the dictionary file (2.20). The percentage frequencies (7.30) of the language file (6.10), which were calculated in the first analysis step, are processed in a second analysis step using the set of rules (5.40) such that the percentage frequencies (7.30) calculated using statistical and/or algorithmic methods in the first analysis step are examined for similarities with the percentage frequencies (3.40) calculated during preparation of the computer system, and such that the language file (6.10) is classified according to the established similarities, i.e. arranged in the multidimensional space (5.30) and associated with at least one known characteristic belonging to the different people from whom the reference language files (1.10) originate. The statistical and/or algorithmic methods mentioned with regard to FIG. 5 are suitable methods here.

Figure 8:
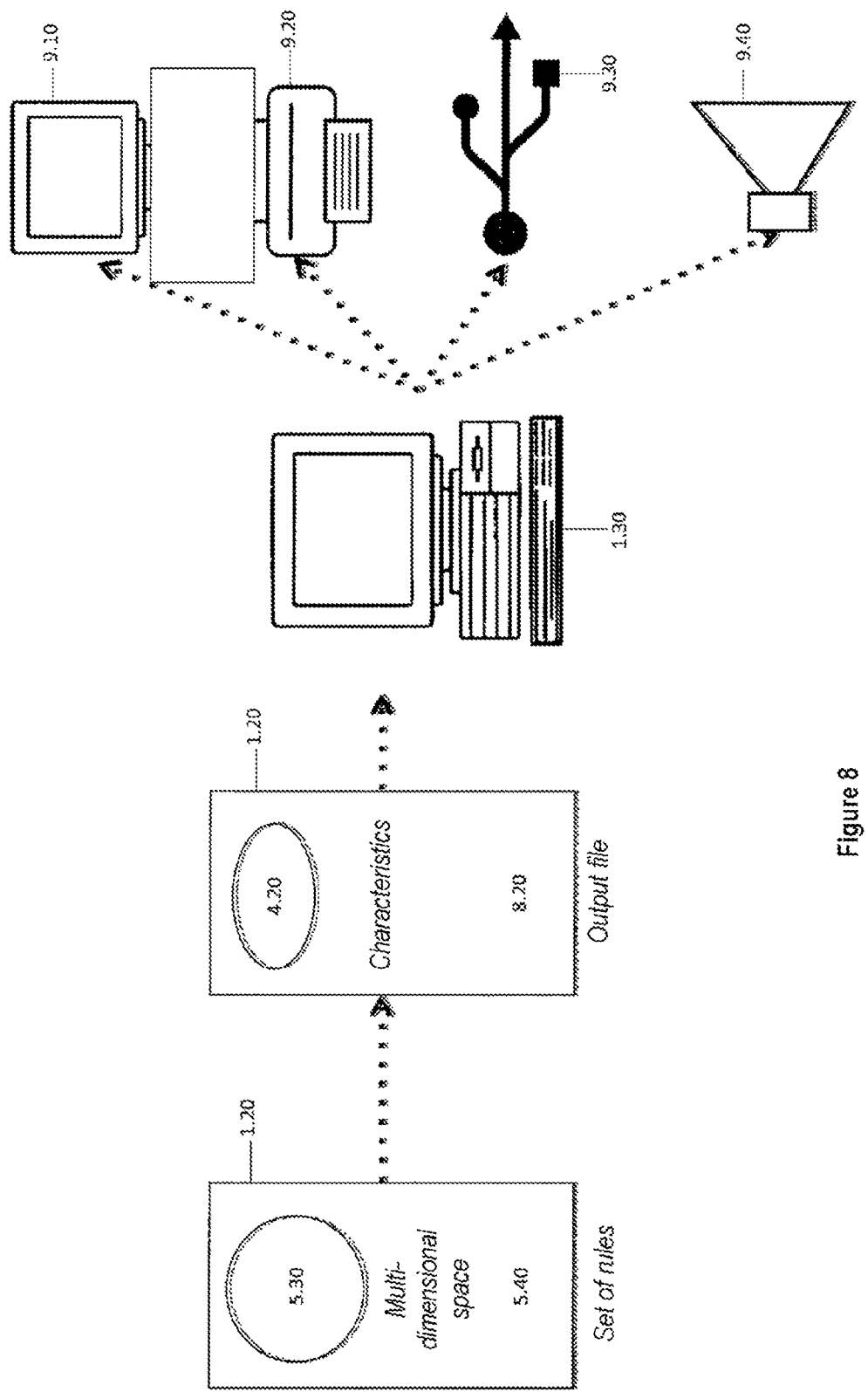
FIG. 8 is a schematic block diagram of an embodiment of the invention showing the step of further processing characteristics of the additional language file.

The results of this analysis (associated characteristics (4.20)) are stored in an output file (8.20) in a memory unit (1.20) of the computer system (1.30) (cf. FIG. 8).

The association can be specified, for example, as an occurrence in % of the characteristic (4.20).

FIG. 8 shows the further processing of the characteristics (4.20) of a language file (6.10) that were associated using the set of rules (5.40). The output file (8.20) containing the associated characteristics (4.20) is output via an output unit (9.10, 9.20, 9.30, 9.40) of the computer system. The output unit may comprise a display unit (9.10) and/or a printer (9.20) and/or an interface (9.30) and/or an electroacoustic transducer (9.40).

Figure 9:
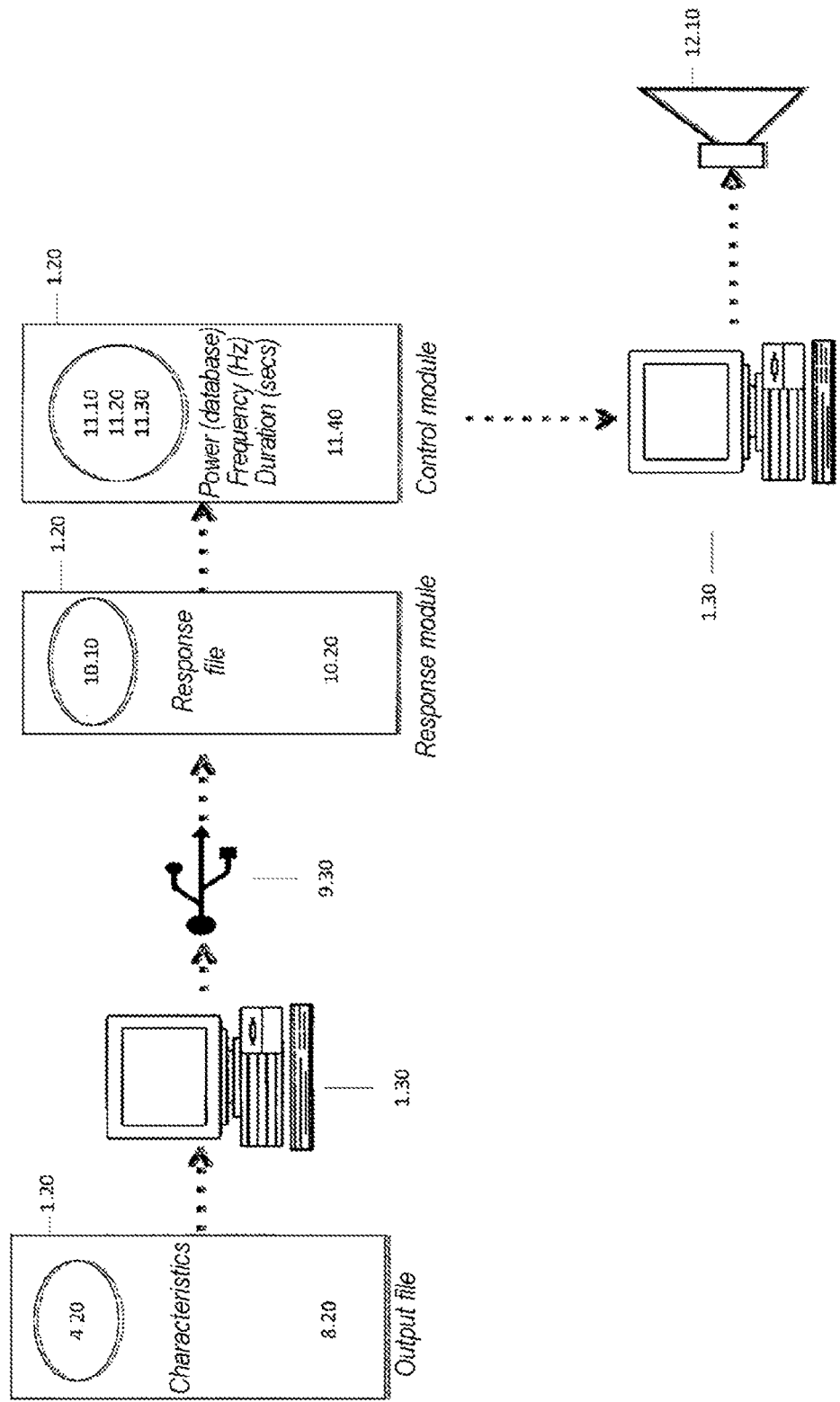
FIG. 9 is a schematic block diagram of an embodiment of the invention showing the step of generating a response file based on a word selection.

FIG. 9 shows an embodiment of the language analysis according to the invention based on word selection, in which a response module (10.20) automatically creates a response file (10.10) as an audio file for the output file (8.20). The responses can be saved as standard responses in a database, which contains associations between the characteristics (4.20) and the standard responses. The audio file is output by an electroacoustic transducer (12.10). A control module (11.40) controls the output by the electroacoustic transducer (12.10) of the response file (10.10), which is in the form of an audio file, according to the characteristics contained in the output file (8.20). The control module (11.40) controls the power (11.10), the frequency (11.20) and the duration (11.30) of the output. The electroacoustic transducer (12.10) converts the electrical signals generated by the control module (11.40) into acoustic signals. For example, the duration of the output of the response file is slowed down (lower rate of speaking) and the frequency of the output is lower than the defined output values for playing the audio file, if the associated characteristic (4.20) infers a particularly nervous person from whom the language file (6.10) originates to which the response module (10.10) is making an automatic response.

Unlike the diagram in FIG. 8, the output file (8.20) is not output directly but supplied via an interface (9.30) to the further data-processing processes by the response module (10.20) and the control module (11.40). The response module (10.20) and/or the control module (11.40) can be stored either on the same computer of the computer system (1.30) as the output file (8.20) or on a computer of the computer system (1.30), which computer is connected via a network and is located, for example, at a customer site.

List of references

| No. | Reference |
|---|---|
| 1.10 | reference language file |
| 1.20 | memory unit |
| 1.30 | computer system |
| 1.40 | reference sample |
| 2.10 | categories |
| 2.20 | dictionary file |
| 2.30 | prosodic information |
| 2.40 | morphological information |
| 2.50 | syntactic information |
| 3.40 | percentage frequency (preparation of computer system) |
| 4.20 | known characteristics |
| 5.30 | multidimensional space (vector space) |
| 5.40 | set of rules |
| 6.10 | language file |
| 7.30 | percentage frequency (analysis) |
| 8.20 | output file |
| 9.10 | display unit |
| 9.20 | printer |
| 9.30 | interface |
| 9.40 | electroacoustic transducer |
| 10.10 | response file |
| 10.20 | response module |
| 11.10 | power |
| 11.20 | frequency |
| 11.30 | duration |
| 11.40 | control module |
| 12.10 | electroacoustic transducer |

The invention claimed is:
1. A method for automated language analysis based on word-selection, comprising the steps:

a) preparing a computer system (1.30) by
- aa) storing a plurality of reference language files (1.10) in a memory unit (1.20) of the computer system (1.30) in order to form a reference sample (1.40), wherein each reference language file (1.10) comprises a minimum number of 100 words, and each reference language file (1.10) originates from a different person having known characteristics, the characteristics including personality traits,
- ab) storing a dictionary file (2.20) containing a multiplicity of different categories (2.10) in a memory unit (1.20) of the computer system (1.30), wherein all the words in the dictionary file (2.20) are classified in at least one of the categories (2.10),
- ac) making an individual comparison of each reference language file (1.10) in the reference sample (1.40) with the dictionary file (2.20) by calculating the percentage frequency (3.40) of occurrence of the words in each reference language file (1.10) that are contained in each category (2.10) of the dictionary file (2.20), and
- ad) storing a set of rules (5.40) in a memory unit (1.20) of the computer system (1.30), wherein the set of rules uses statistical and/or algorithmic methods to calculate associations at least between the percentage frequencies (3.40) calculated in step ac) in one or more categories (2.10) and at least one known characteristic (4.20) of the people from whom the reference language files (1.10) originate, b) following preparation of the computer system in accordance with steps aa)-ad), recording and storing a language file (6.10), in addition to the reference language files (1.10) of the reference sample (1.40), in a memory unit (1.20) of the computer system (1.30), wherein each language file (6.10) and each reference language file is one of a text file or an audio file that is converted into a text file by a transcription, c) analyzing the language file (6.10) additionally recorded and stored in step b), by
- ca) making an individual comparison of the language file (6.10) with the dictionary file (2.20) by calculating the percentage frequency (7.30) of the words in the language file (6.10) that are contained in each category (2.10) of the dictionary file (2.20), and
- cb) using the set of rules (5.40) to process the percentage frequencies (7.30) calculated in step ca), wherein the set of rules uses statistical and/or algorithmic methods to examine the percentage frequencies (7.30) calculated in step ca) for similarities with the percentage frequencies (3.40) calculated in step ac), and classifies the language file (6.10) according to the established similarities, and associates said file with at least one known characteristic belonging to the people from whom the reference language files (1.10) originate, d) creating an output file (8.20), which contains characteristics (4.20) associated with the language file (6.10) in step cb), and e) outputting the output file (8.20) by displaying the output file on a screen, outputting the output file using a speaker, transmitting the output file via a network, or printing the output file using a printer, f)
- fa) expanding the reference sample (1.40) in step aa) by adding as reference language files (1.10), each language file (6.10) recorded in step b),
- fb) providing a feedback through an input, which allows an evaluation of the correctness of the analysis of step c), and
- fc) updating and re-saving the set of rules (5.40) taking into account the enlarged database from step ad).

2. The method as claimed in claim 1, wherein the language file (6.10) is added to the reference sample (1.40) in step fa) only if the language file (6.10) has a specified minimum number of 100 words.

3. The method as claimed in claim 1, further comprising the steps of:
- ga) at least once during recording of the additional language file (6.10) in step b), buffering a partial file of the language file (6.10) in the memory unit (1.20) of the computer system (1.30),
- gb) analyzing the buffered partial file by
  - gba) making an individual comparison of the partial file with the dictionary file (2.20) by calculating the percentage frequency (7.30) of the words in the partial file that are contained in each category (2.10) of the dictionary file (2.20),
  - gbb) using the set of rules (5.40) to process the percentage frequencies (7.30) calculated in step gba), wherein the set of rules (5.40) uses statistical and/or algorithmic methods to examine the percentage frequencies (7.30) calculated in step gba) for similarities with the percentage frequencies (3.40) calculated in step ac), and classifies the partial file according to the established similarities and associates said file with at least one known characteristic belonging to the different people from whom the reference language files (1.10) originate,
- gc) creating an interim output file, which contains characteristics (4.20) associated with the partial file in step gbb), and
- gd) outputting the interim output file.

4. The method as claimed in claim 3, wherein the output file and/or the interim output file contains personality traits and/or characteristics relating to the psychological state of the person.

5. The method as claimed in claim 1, wherein different dictionary files (2.20) are stored on the computer system (1.30) according to the intended use of the method.

6. The method as claimed in claim 1, wherein a plurality of dictionary files (2.20) with different content are stored on the computer system (1.30) in step ab), wherein the dictionary files can be used selectively.

7. The method as claimed in claim 1, wherein step a) additionally comprises recording and storing at least one additional item of information (2.30) of each reference language file (1.10), and the set of rules (5.40) is designed such that using statistical and/or algorithmic methods it also determines associations between the at least one additional item of Information (2.30) and the known characteristics (4.20) of the people from whom the reference language files (1.10) originate, step b) additionally comprises recording and storing the at least one additional item of information (2.30) for each language file (6.10), and step c) comprises in addition to processing the percentage frequencies calculated in step ca), using the set of rules (5.40) to process the at least one additional item of information (2.30) of each recorded language file (6.10), wherein the set of rules (5.40) uses the statistical and/or algorithmic methods to examine the at least one additional item of information (2.30) of each language file for similarities with this at least one additional item of information (2.30) in the reference language files, and wherein the set of rules (5.40) classifies the language file (6.10), taking into account all the established similarities, and associates said file with the occurrence of at least one known characteristic (4.20) belonging to the different people from whom the reference language files (1.10) originate, wherein the reference language file and the language file (1.10, 6.10) are each transcribed from an audio file, and prosodic information is extracted from the audio files as the additional information and/or morphological and/or syntactic information (2.40, 2.50) is extracted from each reference language file and from each language file (1.10, 6.10) as the additional information.

8. The method as claimed in claim 1, further comprising the steps of:

supplying the output file (8.20) containing the language file (6.10) associated characteristics (4.20) of the person to an automatic answering process, generating, by the answering process, a response depending on the characteristics (4.20) associated with the language file (6.10), using standard responses stored in response files (10.10), which contain mappings between the associated characteristics (4.20) of the person and the standard responses, and reproducing, by the electroacoustic transducer (12.10), the response as an audio file.

9. The method as claimed in claim 8, further comprising the step of controlling at least one of the duration (11.30), the frequency (11.20), and the power (11.10) in the step of reproducing by a control module (11.40), whereby the electroacoustic transducer (12.10) converts electrical signals of the control module (11.40) to acoustic signals.

10. A language analysis apparatus for automated language analysis based on word-selection, comprising a computer system (1.30) having at least one memory unit (1.20), an input unit connected to the computer system (1.30), a program, which is stored in at least one memory unit (1.20), that is designed to execute on the computer system (1.30) computer executable steps for performing the method of claim 1.

11. The language analysis apparatus as claimed in claim 10, wherein the computer system (1.30) comprises a plurality of memory units (1.20), and the language files (1.10, 6.10) and the dictionary file(s) (2.20) are stored in different memory units (1.20).

12. The language analysis apparatus as claimed in claim 10, wherein the input unit comprises a voice recognition system.

13. The language analysis apparatus as claimed in claim 10, further comprising at least one of a printer (9.20), a display unit (9.10), and an electroacoustic transducer (9.40) connected to the computer system in order to output the output file (8.20).

14. The language analysis apparatus as claimed in claim 10, wherein:

the program, which is stored in the at least one memory unit (1.20), comprises a response module (10.20) and a control module (11.40), wherein the response module (10.20) includes computer executable steps for automatically creating a response file (10.10) as an audio file for the output file (8.20) based on the characteristics (4.20) of the person in the language file (6.10), the response module (10.20) includes a databank including standard responses as a response file, which contains mappings between the associated characteristics (4.20) of the person and the standard responses, wherein the control module (11.40) includes computer executable steps for controlling the output by an electroacoustic transducer (12.10) of the audio file according to the characteristics (4.20) contained in the output file (8.20), and the electroacoustic transducer (12.10) for outputting the audio file is connected to the computer system (1.30).

15. The language analysis apparatus as claimed in claim 14, wherein the control module is designed to control at least one of the duration, the frequency, and the power of the audio-file output according to the characteristics (4.20) contained in the output file (8.20), wherein the electroacoustic transducer (12.10) generates an acoustic signal based on an electric signal generated by the control module.

16. The method as claimed in claim 1, wherein the categories include at least one of different parts of speech, different semantic fields, and different n-grams.

* * * * *